US007775877B2

(12) United States Patent
Baerlocher et al.

(10) Patent No.: US 7,775,877 B2
(45) Date of Patent: *Aug. 17, 2010

(54) GAMING DEVICE HAVING SELECTIVELY ACCESSIBLE BONUS SCHEME

(75) Inventors: Anthony J. Baerlocher, Reno, NV (US); Peter Gerrard, Prestwich (GB)

(73) Assignee: IGT, Reno, NV (US)

( * ) Notice: Subject to any disclaimer, the term of this patent is extended or adjusted under 35 U.S.C. 154(b) by 1604 days.

This patent is subject to a terminal disclaimer.

(21) Appl. No.: 10/794,192

(22) Filed: Mar. 5, 2004

(65) Prior Publication Data

US 2004/0171416 A1 Sep. 2, 2004

Related U.S. Application Data

(62) Division of application No. 09/657,916, filed on Sep. 8, 2000, now Pat. No. 6,726,563.

(51) Int. Cl.
*A63F 13/00* (2006.01)

(52) U.S. Cl. .............................. 463/25; 463/16; 463/20

(58) Field of Classification Search ..................... 463/1, 463/16, 20, 25–29, 40–42; 273/138.1, 138.2, 273/143 R
See application file for complete search history.

(56) References Cited

U.S. PATENT DOCUMENTS

| | | | |
|---|---|---|---|
| 4,624,459 | A | 11/1986 | Kaufman |
| 4,695,053 | A | 9/1987 | Vazquez, Jr. et al. |
| 5,085,435 | A | 2/1992 | Rossides |
| 5,178,390 | A | 1/1993 | Okada |
| 5,342,047 | A | 8/1994 | Heidel et al. |
| 5,449,173 | A | 9/1995 | Thomas et al. |
| 5,472,196 | A | 12/1995 | Rusnak |
| 5,580,311 | A | 12/1996 | Haste, III |
| 5,620,182 | A | 4/1997 | Rossides |
| 5,749,784 | A | 5/1998 | Clapper, Jr. |

(Continued)

FOREIGN PATENT DOCUMENTS

EP 0945837 A2 3/1999

(Continued)

OTHER PUBLICATIONS

The Game Series Diamond Mine Brochure, IGT, undated.

(Continued)

*Primary Examiner*—John M Hotaling, II
*Assistant Examiner*—Ryan Hsu
(74) *Attorney, Agent, or Firm*—K&L Gates LLP

(57) ABSTRACT

A gaming device having a bonus scheme, wherein the player may choose when to play a bonus scheme, so long as the player is qualified to do so. The method of qualifying the player to enter the bonus round connects or links the base game operation of the gaming device with the bonus scheme. The reels of the base game contain symbols which alone or in combination with other symbols yield one or more bonus awards to a player. The bonus awards are escrowed and displayed a bonus award escrow display. Once the player obtains a single bonus award, the player becomes eligible or qualified to play the bonus round and the player may choose to do so at any time. The player can accumulate bonus awards and use multiple bonus awards at one time.

57 Claims, 8 Drawing Sheets

U.S. PATENT DOCUMENTS

| | | | | |
|---|---|---|---|---|
| 5,816,918 | A | 10/1998 | Kelly et al. | |
| 5,848,932 | A | 12/1998 | Adams | |
| 5,882,261 | A | 3/1999 | Adams | |
| 5,947,820 | A | 9/1999 | Morro et al. | |
| 5,980,384 | A | 11/1999 | Barrie | |
| 5,997,400 | A | 12/1999 | Seelig et al. | |
| 5,997,401 | A * | 12/1999 | Crawford | 463/20 |
| 6,004,207 | A | 12/1999 | Wilson, Jr. et al. | |
| 6,007,426 | A * | 12/1999 | Kelly et al. | 463/16 |
| 6,012,982 | A | 1/2000 | Piechowiak et al. | |
| 6,015,344 | A | 1/2000 | Kelly et al. | |
| 6,056,289 | A | 5/2000 | Clapper, Jr. | |
| 6,059,289 | A | 5/2000 | Vancura | |
| 6,089,977 | A | 7/2000 | Bennett | |
| 6,126,542 | A | 10/2000 | Fier | |
| 6,159,098 | A | 12/2000 | Slomiany et al. | |
| 6,190,255 | B1 | 2/2001 | Thomas et al. | |
| 6,203,430 | B1 * | 3/2001 | Walker et al. | 463/20 |
| 6,269,342 | B1 * | 7/2001 | Brick et al. | 705/20 |
| 6,311,976 | B1 | 11/2001 | Yoseloff et al. | |
| 6,533,273 | B2 | 3/2003 | Cole et al. | |
| 6,602,137 | B2 * | 8/2003 | Kaminkow et al. | 463/16 |
| 6,612,574 | B1 | 9/2003 | Cole et al. | |
| 6,612,575 | B1 | 9/2003 | Cole et al. | |
| 6,699,122 | B1 * | 3/2004 | Osawa | 463/20 |
| 6,739,971 | B2 | 5/2004 | Devaull | |
| 6,857,958 | B2 * | 2/2005 | Osawa | 463/20 |
| 6,958,013 | B2 * | 10/2005 | Miereau et al. | 463/16 |
| 7,011,581 | B2 | 3/2006 | Cole et al. | |
| 7,121,942 | B2 * | 10/2006 | Baerlocher | 463/20 |
| 7,455,585 | B2 * | 11/2008 | Englman | 463/16 |
| 2002/0193158 | A1 * | 12/2002 | Weiss et al. | 463/16 |
| 2003/0078091 | A1 * | 4/2003 | Brandstetter et al. | 463/20 |
| 2003/0211879 | A1 * | 11/2003 | Englman | 463/20 |
| 2004/0033831 | A1 | 2/2004 | Tarantino | |
| 2004/0082373 | A1 | 4/2004 | Cole et al. | |

FOREIGN PATENT DOCUMENTS

| | | | |
|---|---|---|---|
| EP | 0984409 | A2 | 3/2000 |
| GB | 2144644 | A | 3/1985 |
| GB | 2191030 | A | 12/1987 |
| GB | 2222712 | | 3/1990 |
| GB | 2 333 880 | A | 8/1999 |
| GB | 3 353 128 | A | 2/2001 |
| WO | WO 00/12186 | | 3/2000 |

OTHER PUBLICATIONS

5-Line Double Diamond Mine Brochure, IGT, 2000.

Caribbean Gold II Brochure, Aristocrat, 1998.

Major Money's Big Dig Lost City Adventure Game Description, IGT, undated.

Read Hot 7 Game Description, VLC, undated.

Issue Notification for U.S. Patent No. 6,726,563, dated Apr. 28, 2004.

Transmittal of Payment of Issue Fee for U.S. Patent No. 6,726,563, dated Feb. 24, 2004.

Notice of Allowance and Fees Due for U.S. Patent No. 6,726,563, dated Nov. 28, 2003.

Response to Final Office Action to Place Application in Condition for Allowance for U.S. Patent No. 6,726,563, dated Nov. 12, 2003.

Interview Summary for U.S. Patent No. 6,726,563, dated Oct. 31, 2003.

Final Office Action for U.S. Patent No. 6,726,563, dated Oct. 20, 2003.

Interview Summary for U.S. Patent No. 6,726,563, dated Apr. 30, 2003.

Non-Final Office Action for U.S. Patent No. 6,726,563, dated Mar. 20, 2003.

Response to Office Action for U.S. Patent No. 6,726,563, dated Jul. 21, 2003.

Supplemental Information Disclosure Statement for U.S. Patent No. 6,726,563, dated Feb. 18, 2002.

Non-Final Office Action for U.S. Patent No. 6,726,563, dated Jul. 31, 2002.

Response to Office Action for U.S. Patent No. 6,726,563, dated Dec. 27, 2002.

Information Disclosure Statement and Preliminary Amendment for U.S. Patent No. 6,726,563, dated Mar. 9, 2001.

* cited by examiner

GAMING DEVICE HAVING SELECTIVELY ACCESSIBLE BONUS SCHEME

PRIORITY CLAIM

This application is a divisional application of U.S. patent application, Ser. No. 09/657,916, filed on Sep. 8, 2000, now U.S. Pat. No. 6,726,563 entitled "Gaming Device Having Selectively Accessible Bonus Scheme", which is incorporated herein in its entirety.

CROSS-REFERENCE TO RELATED APPLICATIONS

This application is related to the following commonly-owned co-pending patent applications: "GAMING DEVICE HAVING A SELECTIVELY ACCESSIBLE BONUS SCHEME," Ser. No. 11/748,267.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and in particular to a gaming device having a bonus scheme that is selectively accessible by the player from the base game operation of the gaming device, which increases player excitement and enjoyment.

BACKGROUND OF THE INVENTION

The popularity of a gaming devices depends in part upon the level of enjoyment and excitement that the game provides to its players. Gaming device manufacturers constantly strive to make gaming devices that provide as much enjoyment and excitement as possible. Providing a bonus round or bonus scheme in which a player has an opportunity to win larger awards or credits in conjunction with the base game operation of the gaming device is one way to enhance player enjoyment and excitement.

Known gaming devices having bonus schemes have employed a triggering event that occurs during the base game operation of the gaming device. The triggering event enables a player to play a bonus round or bonus game to its fruition and then return to the base game. One such game is the TOP DOLLAR™ game, which is manufactured and distributed by International Game Technology, the assignee of this application. In the TOP DOLLAR™ game, the player plays a primary game until reaching the bonus round, which occurs when a combination of the reels of the gaming device matches a combination programmed into the controller of the gaming device. Another example is disclosed in European Patent Application No. EP 0 945 837 A2 filed on Mar. 18, 1999 and assigned on its face to WMS Gaming, Inc. Here, the device operates in a basic mode until a "start bonus" event occurs, which causes the device to shift to a bonus mode. In both bonus schemes, the device randomly determines when the bonus round begins, and the player plays the bonus scheme until the bonus round ends.

The European Patent Application No. EP 0 945 837 also discloses a "bonus resource" that a player may obtain during the normal operation of the gaming device, which the player can thereafter apply during the bonus round. However, the level of interaction between the base game and the bonus scheme is limited to the function assigned to the bonus resource, such as overriding an event that would otherwise end the bonus round.

In an effort to provide a new and attractive way to satisfy the demands of players, one solution is to provide a gaming device having a bonus scheme in which the player may selectively enter the bonus round whenever the player is qualified to do so. Also, providing a bonus scheme that interacts with the base game operation of the gaming device would enhance player enjoyment and excitement.

SUMMARY OF THE INVENTION

The apparatus and method of the present invention provides a gaming device having a bonus scheme, wherein the player may choose when to play the bonus scheme as long as the player is qualified to do so. The method of qualifying the player to enter the bonus round connects or links the base game operation of the gaming device with the bonus scheme. Both the control given to the player and the interaction of the base game and the bonus scheme enhance player excitement and enjoyment and serve to differentiate the present invention from known gaming devices.

In general, the reels of the base game of the present invention contain a plurality of symbols which alone or in combination with other symbols yield one or more bonus awards to a player. The bonus awards are escrowed in a separate area of memory and are shown in a separate escrow display. Once the player obtains a single bonus award, the player becomes eligible or qualified to play the bonus scheme, and the player may choose to do so at any time. The player plays the bonus scheme by applying one or more bonus awards to prize areas or indicators of the bonus scheme that have a cost associated with their play. The more expensive prize areas or indicators have a potentially higher payout or prize.

In the preferred embodiment of the present invention, the bonus awards are keys and the prize areas or indicators, which are more or less expensive to play, are keyholes. This embodiment includes a 1-key keyhole, a 2-key keyhole and a 3-key keyhole. The keyholes cost one, two and three keys, respectively, to play. A player with three keys may play the 3-key keyhole once, the 1-key keyhole three times, or the 2-key keyhole once and the 1-key keyhole once.

Each indicator or keyhole is associated with a separate prize map stored in the memory or processor of the game's controller. In the preferred embodiment, the prize map of the 3-key keyhole contains, on average, the most valuable prizes, while the 1-key keyhole contains, on average, the least valuable prizes. To play a keyhole, the player presses a button associated with the keyhole. After pressing a button associated with the keyhole, the game randomly selects a prize from the appropriate prize map and subtracts the appropriate number of keys from the player's key escrow. The prizes preferably are base game credits, or alternatively are base game credit multipliers.

The game's controller stores individual symbols and combinations of symbols that appear on the video reels of the gaming device during its base game operation. When these symbols appear on the reels after a player plays the base game, the game awards bonus awards or keys to the player. A particular symbol may be worth one or a plurality of keys, likewise a combination of symbols may be worth one or a plurality of keys. The present invention preferably places an upper or predetermined limit on the amount of keys that a player may accumulate in escrow during the base game operation of the slot machine. When a player reaches this limit, the player must use the escrowed keys. However, the game enables the player to wait, accumulate many keys and then play the bonus scheme for a relatively long period of time. Conversely, the player may play a key or a set of keys as soon as the player acquires them. Accordingly, after the player is qualified (i.e., the player has at least one bonus award), the player may selectively decide to play the bonus round at any time.

It is therefore an object of the present invention to provide a gaming device having a bonus scheme, wherein the player may selectively choose when to play the bonus scheme, and wherein the bonus scheme interacts with the base game operation of the gaming device.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device

Figure 1:
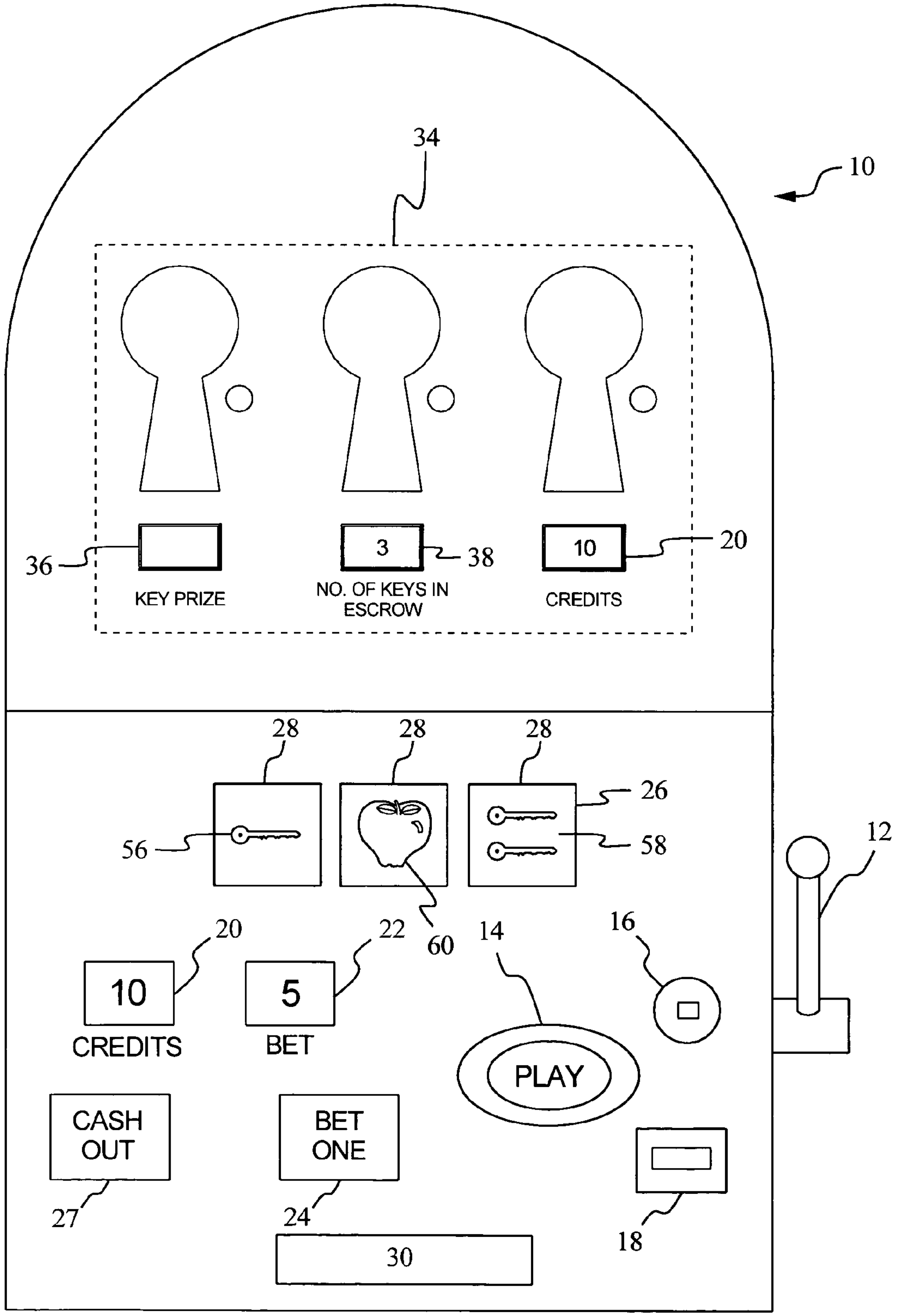
FIG. 1 is a diagram of a gaming device having a multiple selectively accessible bonus scheme.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) which a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

A player may play the gaming device or slot machine 10 by pulling an arm 12 or by pushing a play button 14: The player operates the slot machine 10 by placing coins in the coin slot 16 or paper money in the bill acceptor 18. Other devices for accepting payment such as readers or validators for credit cards or debt cards could be used. When a player puts money in the slot machine 10, a number of credits corresponding to the amount deposited is shown in a credit display 20.

The slot machine 10 also includes a bet display 22 and a bet one button 24. The player places a bet by pushing the bet one button 24 and increases the bet by one credit each time the player pushes the bet one button 24. When the player pushes the bet one button 24, the number of credits shown in the credit display 20 decreases by one, and the number of credits shown in the bet display 22 increases by one.

The slot machine 10 has a payout display 26 that contains a plurality of reels 28. Slot machines commonly employ three to five reels that are either mechanical or simulated. Each reel has a plurality of symbols such as bells, hearts, fruits, numbers, letters, bars, etc. that preferably correspond to a theme associated with the slot machine 10. When the player pulls the arm 12 or pushes the play button 14, the processor of the computer causes the reels 28 to spin. The reels spin until the processor halts the reels individually or in any combination programmed into the memory of the computer or controller. When all the reels stop spinning, individual symbols on a reel or a combination of symbols from all the reels can trigger a credit award and/or a bonus award if the symbols or the combination displayed is contained in a winning symbol database or a winning combination database, respectively, programmed into the memory of the computer.

FIG. 1 illustrates a set of symbols of the reels 28 showing, from left to right, a key, an apple, and two keys. In the present invention (discussed below), the bonus scheme awards the player a bonus award each time a reel displays a pre-programmed symbol, for example, a key. The bonus award enables the player to play a bonus round and win a bonus prize. It should be appreciated that any symbols could be placed on the reels or programmed into a database stored in the memory of the computer to trigger a bonus award and enable the bonus round.

A player may "cash out" and thereby receive a number of coins corresponding to the number of credits in the credit display 20 at any time by pushing a cash out button 27. When the player "cashes out," the player receives the coins in a coin payout tray 30. The slot machine 10 may employ other payout mechanisms such as credit slips redeemable by a cashier or electronically recordable cards that keep tract of the player's credits. It should also be appreciated that while the bonus scheme of the present invention will be described for use with a slot machine, other gaming devices such as a video card game could employ the bonus scheme of the present invention.

Referring still to FIG. 1, the bonus scheme of the present invention generally includes a computer or controller described below, a plurality of bonus prize areas discussed below, a prize display 36, an escrow display 38, and the credit display 20, described above. Alternatively, the bonus scheme could employ a simulated display area 34, shown by dotted lines, that contains the bonus prize areas, prize display, escrow display and credit display. The bonus scheme could also function without the credit display 20.

Gaming Device and Bonus Scheme Electronics

Figure 2:
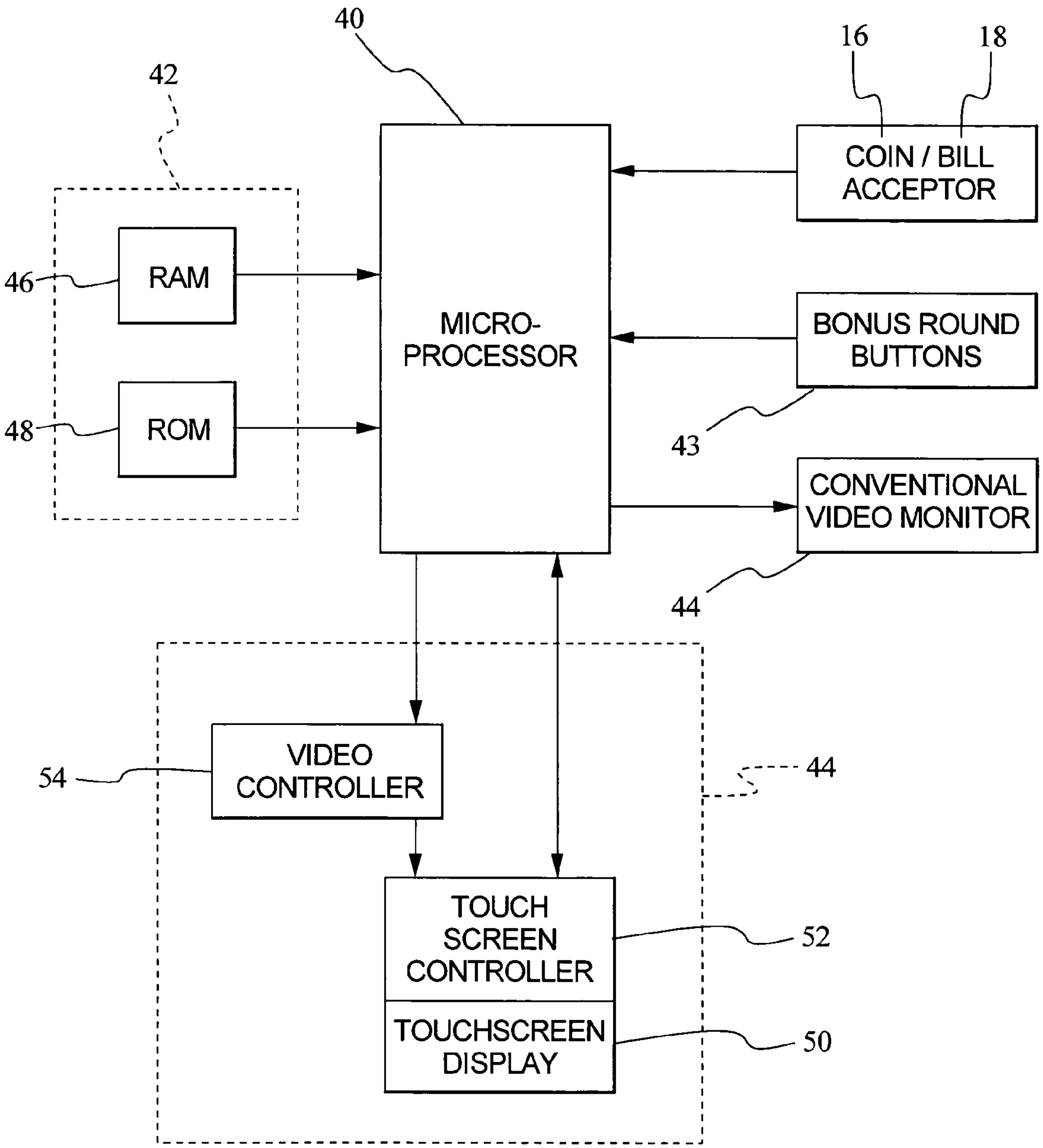
FIG. 2 is a schematic diagram of the controller of the present invention.

The controller of slot machine 10 preferably has the electronic configuration generally illustrated in FIG. 2, which includes: a processor 40; a memory device 42 for storing program code or other data; possibly a video monitor 44 such as a cathode ray tube ("CRT") or a liquid crystal display ("LCD") for displaying items such as the keyholes or the reels; and at least one input device such as the arm 12, the play button 14, the bet one button 24 and the cash out button 27. The processor 40 is preferably a microprocessor or microcontroller-based platform which is capable of displaying images, symbols and other indicia such as images of people, characters, places, things and faces of cards.

The processor 40 can be programmed to require the player to deposit a certain amount of money to start the game and control the coin slot 16 and the bill acceptor 18. In the present invention, the processor 40 randomly selects the symbols of the reels by determining when to stop their rotation. The processor accumulates the bonus awards as the player plays the slot machine 10. The processor also randomly selects prizes to award the player when the player applies the bonus awards to the bonus scheme.

The memory device 42 typically includes random access memory ("RAM") 46 for storing event data or other data generated or used during a particular game. The memory device 42 can also include read only memory ("ROM") 48 to store program code so that slot machine 10 plays a particular game in accordance with applicable game rules and pay tables. In the present invention, the memory device 42 stores the symbols and combinations of symbols in databases that equate to the symbols and combinations of one or more bonus awards. The memory device 42 also stores a prize map or prize database for each bonus prize area.

The game preferably employs separate electro-mechanical bonus scheme buttons to enter selections into the processor 40, shown figuratively by block 43. The game also provides mechanical bonus prize areas and separate prize, escrow, and credit displays. Alternatively, the present invention could employ a video monitor 44 that contains the display area 34 having the bonus prize areas, the prize display 36, the escrow display 38, and the credit display 20. This embodiment would also employ separate electromechanical bonus scheme buttons 43 to enter selections into the processor 40.

Further alternatively, the present invention could employ a touch screen 50 and an associated touch screen controller 52 as an integral part of video monitor 44 instead of the conventional video monitor 44. The touch screen 50 and the touch screen controller 52 would be connected to a video controller 54 and the processor 40. The player could make decisions and input signals into the processor 40 by touching the touch screen 50 at places representing the buttons for inputting selections. The touch screen would obviate the need for the bonus scheme buttons 43 The present invention can also be implemented using one or more application-specific integrated circuits ("ASIC's") or other hard-wired devices, or using mechanical devices. Furthermore, although the processor 40 and memory device 42 preferably reside on each slot machine 10, it is possible to provide some or all of their functions at a central location such as a network server for communication to a playing station such as over a local area network ("LAN"), wide area network ("WAN"), Internet connection, microwave link, and the like. Such systems are also referred to herein as a processor or controller.

Bonus Scheme

Referring again to FIG. 1, the bonus scheme is operable any time a player has a bonus award, i.e. an option to play for a prize, in escrow. A player preferably obtains bonus awards from the base game operation of the gaming device 10. In the preferred embodiment of the invention, a bonus award is a key. Certain symbols on the reels 28 stored in the memory device 42 correspond to or yield bonus awards or keys. It should be appreciated that a bonus award could have any suitable indicia for indicating an award. For instance, instead of a key and a keyhole, the bonus scheme could employ a dog and a bone, where the player gets a prize for giving the dog a bonus award, the bone. For illustration purposes, the present invention will be described using keys as the bonus awards.

In the present invention, certain symbols or combinations of symbols displayed on the reels 28 correspond to or yield keys. For example, the reels 28 in FIG. 1 show a one-key symbol 56 and a two-key symbol 58. In the present invention, the one key symbol 56 can yield a bonus award of one key. The two-key indicia 58 can yield a bonus award of two keys. However, other symbols such as the apple 60 might not provide any bonus awards. The implementor of the present invention can store in memory device 42 any number of key awards for obtaining the any symbol on a reel 28. Alternatively, the implementor can store in memory device 42 any number of key awards for obtaining any combination of symbols (i.e., two or three apples on the reels 28).

Figure 3:
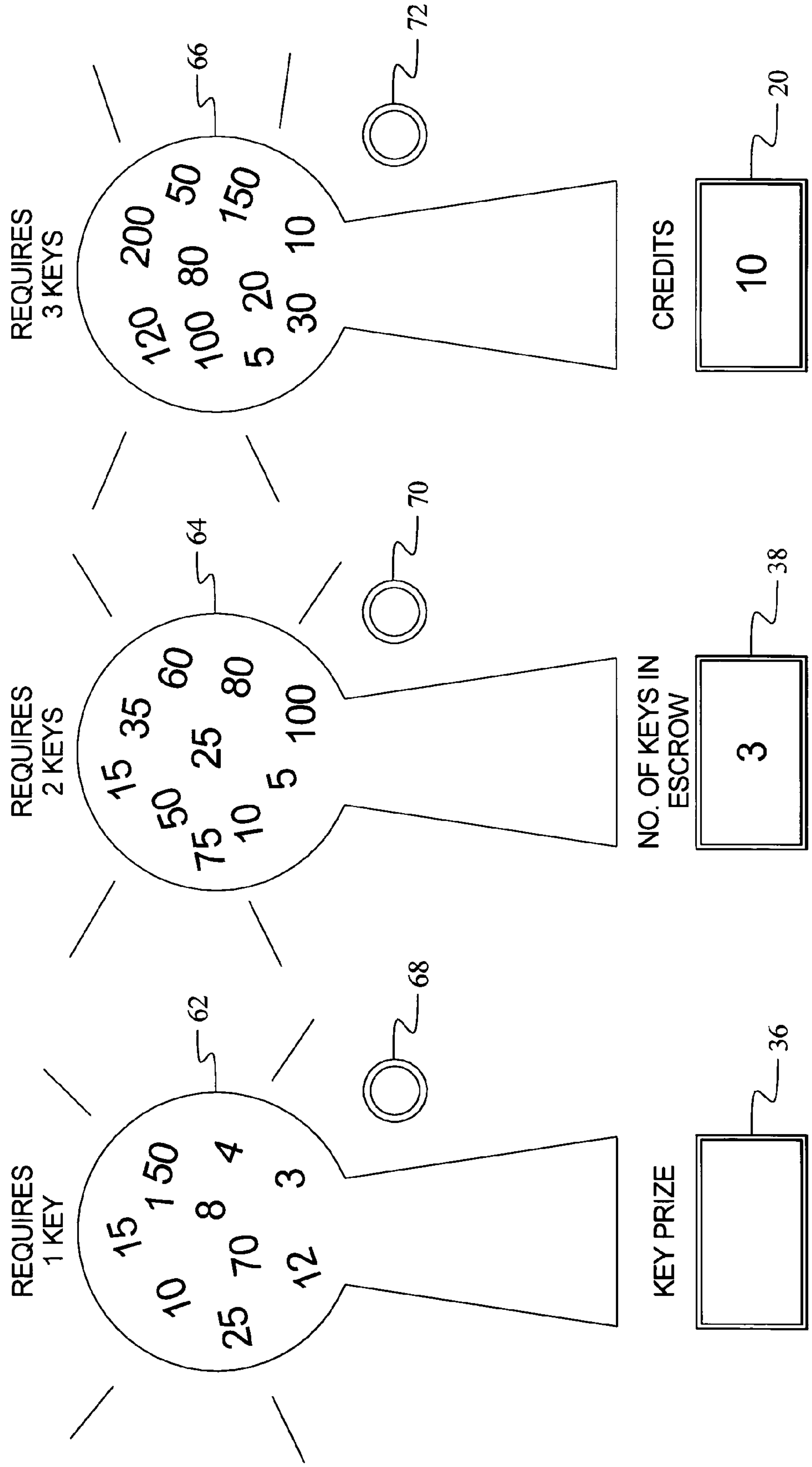
FIG. 3 is a diagram of an embodiment of the bonus scheme showing multiple key-ways for the player to apply bonus credits.

Referring now to FIG. 3, an enlarged view of the bonus scheme display area 34 from FIG. 1 is illustrated. When the game awards the player with a number of keys for obtaining a preprogrammed symbol or combination of symbols, the game adds the amount of the award to the escrow display 38. Preferably, there is a limit to the number of bonus awards or keys that a player may accumulate. To enhance player excitement and enjoyment, the present invention preferably provides an indication that the game is adding keys to the escrow display 38. For example, the game could illuminate the escrow display 38 while adding to it and sound a bell or suitable audible signal upon each increment of display 38.

In the preferred embodiment, a bonus prize area or indicator is a keyhole as shown. FIG. 3 shows keyhole 62, keyhole 64 and keyhole 66 as bonus prize areas. It should be appreciated that a bonus prize area or indicator could contain other suitable indicia corresponding to a game theme. For instance, in the above example where the bonus award was a dog bone, the bonus prize area or indicator would contain a dog instead of a keyhole.

Each bonus prize area or indicator, referred to herein as a keyhole, is associated with a prize map or database stored in the memory device 42. The implementor differentiates the prize maps by placing prizes having a higher average value in the prize map of keyhole 64 than in the prize map of keyhole 62. Likewise, the prize map of keyhole 66 contains prizes having a higher average value than does the prize map of keyhole 64. The prizes of keyholes 62, 64 and 66 can overlap, but generally a player that wishes to receive the most valuable prize possible will play keyhole 66, then keyhole 64, and finally keyhole 62.

The present invention preferably provides an indication of the potential value of a prize from each of the prize areas or indicators. The game increases fun and excitement by making the player decide whether a particular prize area or indicator is worth the cost of playing. The game preferably places a small amount of relatively valuable prizes in the prize area or indicator having the lowest average prize values. This entices the player to play for the one of the few big awards. The game also preferably places a small amount of relatively low value prizes in the prize area or indicator having the highest average prize values. This places a small amount of fear and excitement in the player, who now knows that the game can award one of the lower values.

FIG. 3 shows keyholes 62, 64 and 66 displaying a plurality of prizes from their respective prize maps. The present invention can display all the prizes from a prize map. Alternatively, the present invention can display a representative sample of the prizes. The indicators or keyholes can display different prizes at different times. The prize samples preferably provide the player with an indication of the average value of a prize map as well as the range of prizes of a prize map.

The game also differentiates the indicators or keyholes by requiring more keys to play for a higher prize. In the preferred embodiment, keyhole 62 only requires one key from the escrow. Keyhole 64 requires two keys from the escrow, and to play for the most valuable prize, keyhole 66 requires three keys from escrow. Similar to the bet display 22 described in FIG. 1, when the player plays keyhole 62, the number of keys shown in the escrow display 38 decreases by one. When the player plays keyhole 64, the number of keys shown in the escrow display 38 decreases by two. When the player plays keyhole 66, the number of keys shown in the escrow display 38 decreases by three. It should be appreciated that the cost of the keyholes could be scaled in any linear or non-linear configuration (e.g., 2,4,6 or 1,3,5 respectively) so long as the keyhole with the most valuable prize map (e.g., keyhole 66) costs the most and the keyhole with the least valuable prize map (e.g., keyhole 62) costs the least.

In the preferred embodiment, there are only three indicators or keyholes. Alternatively, the present invention contemplates providing any number of indicators. Preferably, the game displays the cost of each bonus prize area or keyhole to the player by placing it in an obvious place and in close proximity to the respective keyhole. For example, FIG. 3 clearly indicates a cost of "1 key" above keyhole 62, a cost of "2 keys" above keyhole 64 and a cost of "3 keys" above keyhole 66. The game also preferably illuminates and maintains the illumination for the keyholes that the player is eligible to play. If the player has three keys, the game illuminates all three keyholes since the player could choose to play any one of the three. If the player has two keys, the game illuminates a 1 key keyhole and a two key keyhole. If the player has only one key, then the game only illuminates a 1 key keyhole because it is the only keyhole the player can play.

The game preferably includes a separate play button or selector for each keyhole or bonus prize area. Namely, the game includes a button or selector 68 for keyhole 62, a button or selector 70 for keyhole 64 and a button or selector 72 for keyhole 66. As illustrated with FIG. 2, selectors 68, 70 and 72 are preferably electromechanical as generally shown by block 43. Alternatively, the selectors can be simulated and contained in a touch screen display 50 of video monitor 44. In either embodiment, the player selects a prize by pushing the selector corresponding to the desired keyhole.

When the player selects a prize by pushing selector or play button 68, 70 or 72, the escrow display subtracts the appropriate amount of keys, and the prize display 36 shows the prize randomly selected by processor 40. The present invention preferably awards base game credits as the prize. Alternatively, the game could award a base game multiplier (values that the game multiplies by the player's bet) as the prize or any other suitable prize.

In the event that the player runs out of base-game credits while maintaining bonus awards in escrow, the present invention contemplates enabling the player to play the bonus scheme (by touching an illuminated selector) until the player plays one or more of the bonus awards. The gaming device preferably does not enable the player to cash out while the player has bonus awards in escrow.

Bonus Scheme Sequence

Figure 4:
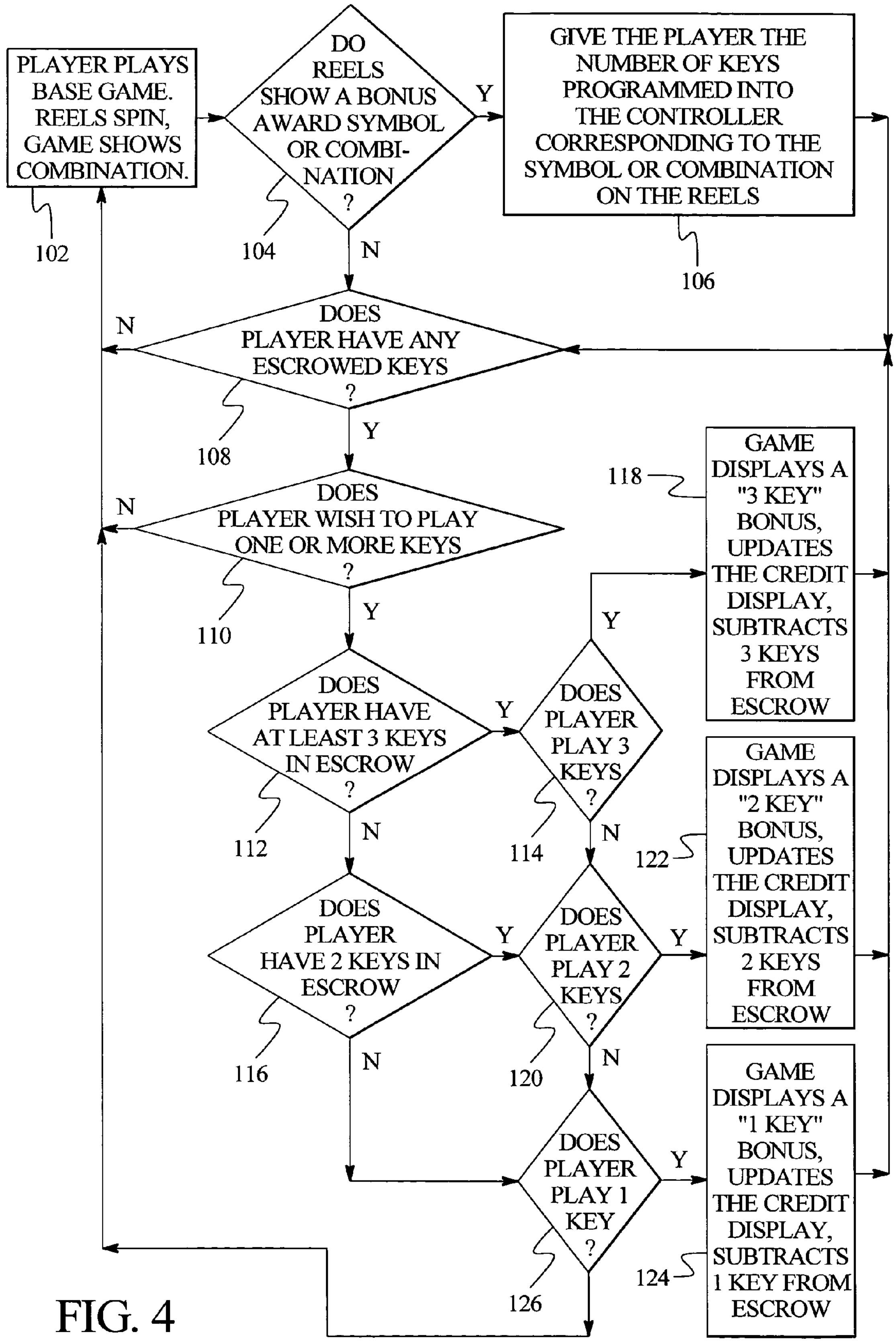
FIG. 4 is a flow diagram of the bonus scheme of the present invention.

FIG. 4 illustrates the sequence of operation of the preferred embodiment of the present invention. As indicated by block 102, the player plays the base game by pulling the arm 12 or pushing the play button 14, the reels 28 spin and stop, and the payout display 26 shows a combination of reels 28 containing symbols, some of which could yield or form a combination which could yield one or more bonus award or keys to the player. If the reels show one or more bonus award symbols or a bonus award combination as determined in diamond 104, the game awards the player with the number of keys stored in memory device 42 corresponding to the symbol or combination displayed as indicated by block 106.

If the reels do not show any symbols or combinations that yield bonus award keys as determined in diamond 104, the bonus scheme may still be operable if the player has at least one bonus award or key in escrow as determined in diamond 108. The present invention enables the player to play the bonus scheme any time the player has keys in escrow. If the player has no keys in escrow as determined in diamond 108, then the player returns to the base game operation of slot machine 10 as indicated by block 102.

If the player has keys in escrow as determined in diamond 108, then the player may play one or more of the keys. As indicated in diamond 110, if the player does not wish to play a key, then the player returns to the base game operation of slot machine 10 as indicated by block 102. If the player wishes to play one or more keys, then the player determines how many keys to play.

In the preferred embodiment, if the player has at least three keys in escrow as determined in diamond 112, then the player is eligible, but not required, to play the three key keyhole 66. If the player has at least three keys, the player decides whether to play three keys as determined in diamond 114. If the player decides to play three keys, the player presses the button 72 for keyhole 66. The processor 40 randomly selects a prize from the prize map for keyhole 66 stored in the memory device 42, displays the prize in the prize display 36, updates the credit display 20, and subtracts three keys from escrow, as indicated by block 118.

If the player does not wish to play three keys as determined in diamond 114, the player may decide to play two keys as determined in diamond 120. If so, the player presses the button 70 for keyhole 64. The processor 40 randomly selects a prize from the prize map for keyhole 64 stored in the memory device 42, displays the prize in the prize display 36, updates the credit display 20, and subtracts two keys from escrow, as indicated by block 122. If not, then the player may play one key. If so, as determined in block 126, the player presses the button 68 for keyhole 62. The processor 40 randomly selects a prize from the prize map for keyhole 62 stored in the memory device 42, displays the prize in the prize display 36, updates the credit display 20, and subtracts one key from escrow, as indicated by block 124. If not, the player returns to the base game as indicated by block 102.

If the player does not have at least three keys in escrow as determined in diamond 112, then the player is not eligible to play three keys but may be eligible to play two keys or one key. If the player has two keys in escrow as determined in diamond 116, then the player can decide to play two keys or one as determined in diamond 120. If the player plays one or two keys, the game proceeds as described above. If the player does not have two keys in escrow as determined in diamond 116, and knowing the player has at least one key as previously determined in diamond 108, then the player can only play one key in the manner described above.

After the player plays one, two, or three keys as indicated by blocks 124, 122 and 118, respectively, the game enables the player to play the bonus scheme again as long as the player has keys in escrow as determined in diamond 108, and as long as the player wishes to play the bonus scheme as determined in diamond 110. Otherwise, the player may return to the base game operation of the slot machine 10 as indicated by block 102.

In one example of the preferred embodiment of the present invention illustrated by FIGS. 1, 3, 5 and 6, the player pulls the arm 12, the reels 28 spin and stop and then display the "1 key" symbol, the apple, and the "2 key" symbol. The game, employing a database stored in the memory device 42, awards the player one key for the "1 key" symbol and two keys for the "2 key" symbol. The reels show no combination stored in memory device 42 that would trigger an award, so the total reward is the three keys. Preferably, the game gives some indication of success, such as sounding a bell and lighting the escrow display, as the escrow display 38 updates and displays the three keys. The game also illuminates all three keyholes 62, 64 and 66 because the player is qualified to select any bonus prize area.

Figure 5:
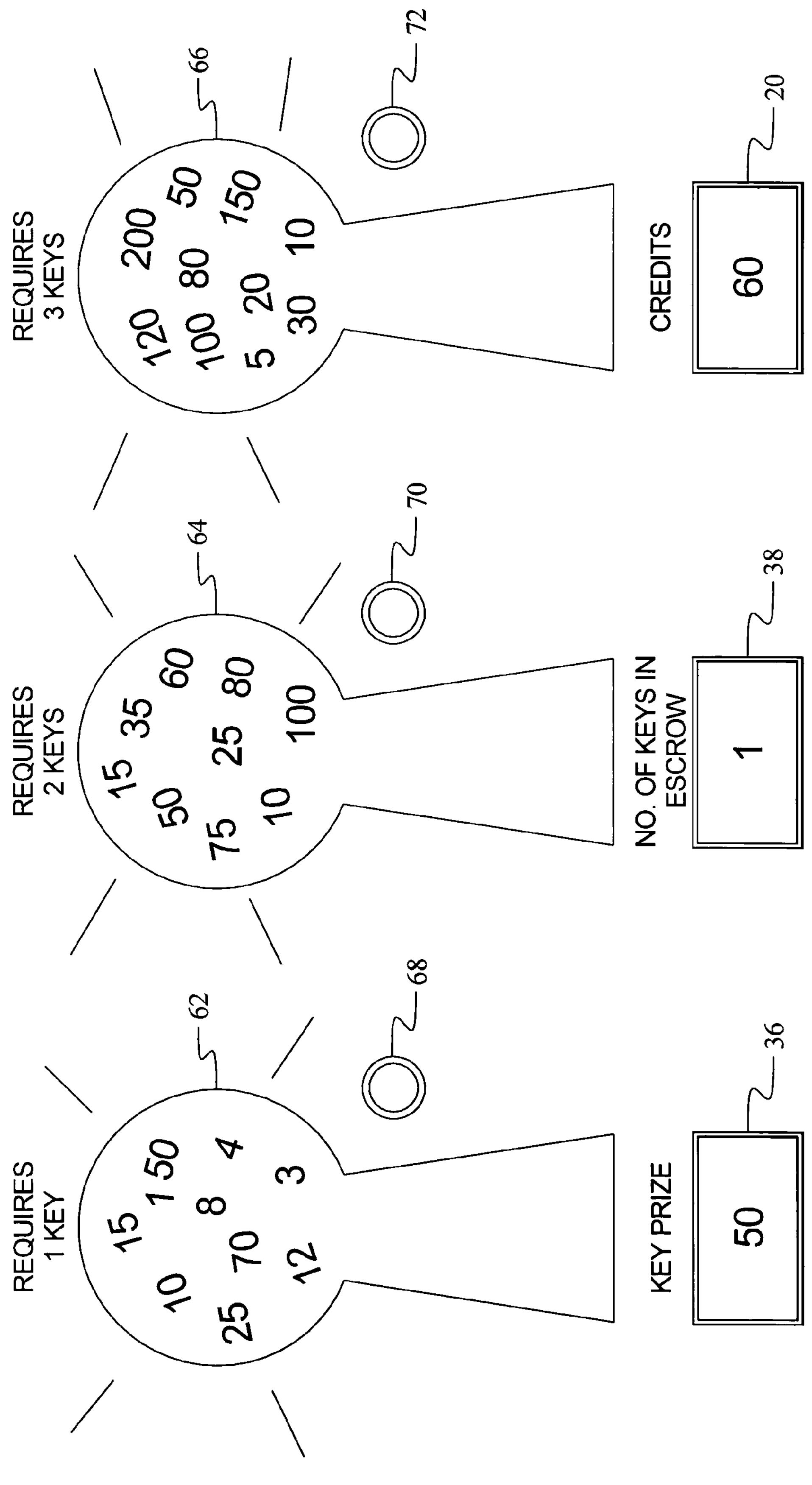
FIG. 5 is a diagram of an embodiment of the bonus scheme showing multiple key-ways after the player has applied bonus credits.

FIG. 3 shows an enlarged view of bonus scheme display area 34 from FIG. 1. The player has three keys and ten base game credits. The player wants to play the bonus scheme but does not want to play all the keys at once, so the player presses the button 70 for the two key keyhole 64. The game preferably gives some indication that the device is "thinking" of the prize to award the player, as the processor 40 randomly selects a prize, fifty base-game credits, from the prize map of keyhole 64. The game awards the player the fifty base-game credits for playing keyhole 64 and subtracts two keys from the player's escrow as the cost for playing keyhole 64, as shown in FIG. 5. Alternatively, the game could award a 50X multiplier, multiply the amount bet (5 base-game credits shown in bet display 22 of FIG. 1) by the multiplier to yield a prize of two hundred and fifty base-game credits.

Referring still to FIG. 5, the game preferably displays the prize for playing a key in the prize display 36. The bonus scheme could display the prize momentarily and indicate success to the player through audible and visible signals or maintain the display until the player plays another key. Preferably, the game adds the fifty base game credits to the player's credit display 20 as is illustrated by FIGS. 3 and 5 (multiplier alternative not shown). In another embodiment, the game pays the player a sum of money and does not update the credit display 20.

The player has one key left in escrow, as shown in the escrow display 38 and by the fact that only keyhole 62 remains lit. The player wishes to apply the remaining key to keyhole 62. The player is not presently qualified to play either keyhole 64 or keyhole 66, which cost too much. If the player attempts to play either, the game may simply do nothing or, alternatively, momentarily provide a visual or audible signal, such as a buzzing noise, to inform the player of the mistake. Preferably, the game does not penalize the player for choosing an unqualified keyhole.

Figure 6:
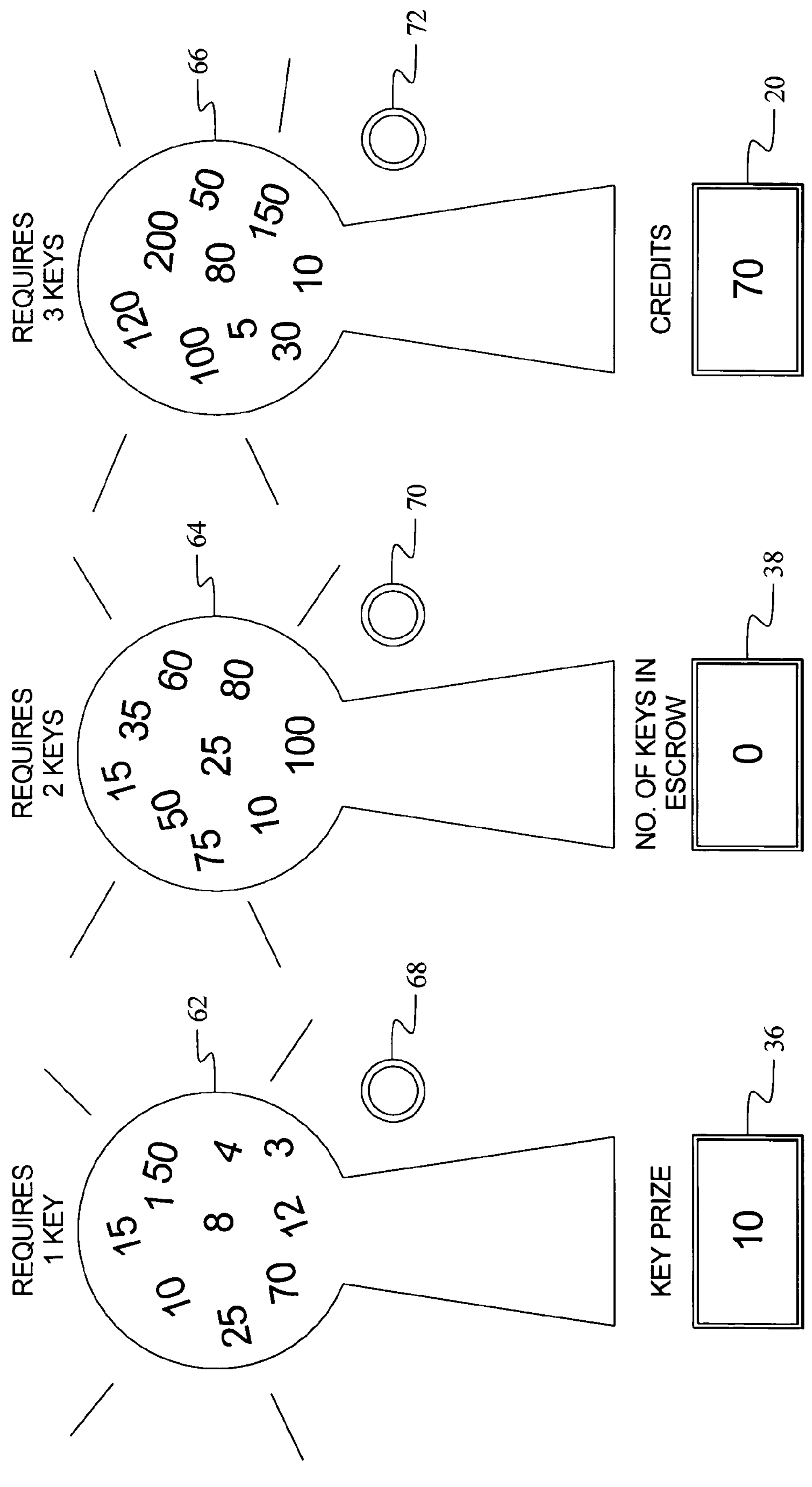
FIG. 6 is a diagram of an embodiment of the bonus scheme showing multiple key-ways after the player has spent all the player's bonus credits.

At any time the player may go back to play the base-game, but in this example, the player applies the remaining key to the keyhole 62. The player's only bonus option is to play keyhole 62, which the player does by pressing button 68. The game indicates that the device is "thinking" of the prize to award the player, as the processor 40 randomly selects a prize of ten base-game credits (alternatively a 10X multiplier), from the prize map of keyhole 62. The game awards the player the ten base-game credits, subtracts the remaining key from the player's escrow as the cost for playing keyhole 62, and adds the ten base-game credits to the credit display 20, as shown in FIG. 6. The player now has no more keys and returns to the base game operation of slot machine 10.

FIG. 6 shows a "0" in the escrow display 38 to inform the player that no more bonus award keys remain. Alternatively, FIG. 3 leaves the escrow display 38 blank when the player has no keys. The present invention contemplates both alternatives and a third alternative in which the game displays a "0" or some other suitable symbol momentarily before blanking the escrow display 38. FIG. 6 shows that the game lights none of the keyholes as another indication that the player is not currently qualified to play the bonus scheme.

In this example, the bonus scheme awarded the player a more valuable prize after playing keyhole 64 (50 base game credits) than did the scheme after playing keyhole 62 (10 base game credits). On average, the bonus scheme will proceed in this manner. It should be appreciated that due to the random nature of the bonus scheme, in any given situation, playing keyhole 62 could yield an equal or even a slightly more valuable prize than playing keyhole 64. Stated another way, the implementor could enter the same prize value into the prize map for keyholes 62, 64, and 66.

The above example is not meant to imply that, on average, the prizes of keyhole 64 are five times as valuable as are the prizes of keyhole 62. The implementor may assign any relative average weighting to the various keyholes or bonus prize areas in accordance with the game theme and with the relative cost of each keyhole. Further, the relationship between the averages of the values of the prize maps could be linear or non-linear, as necessary, to maximize player enjoyment and excitement.

Random Prize Map Selection

Figure 7:
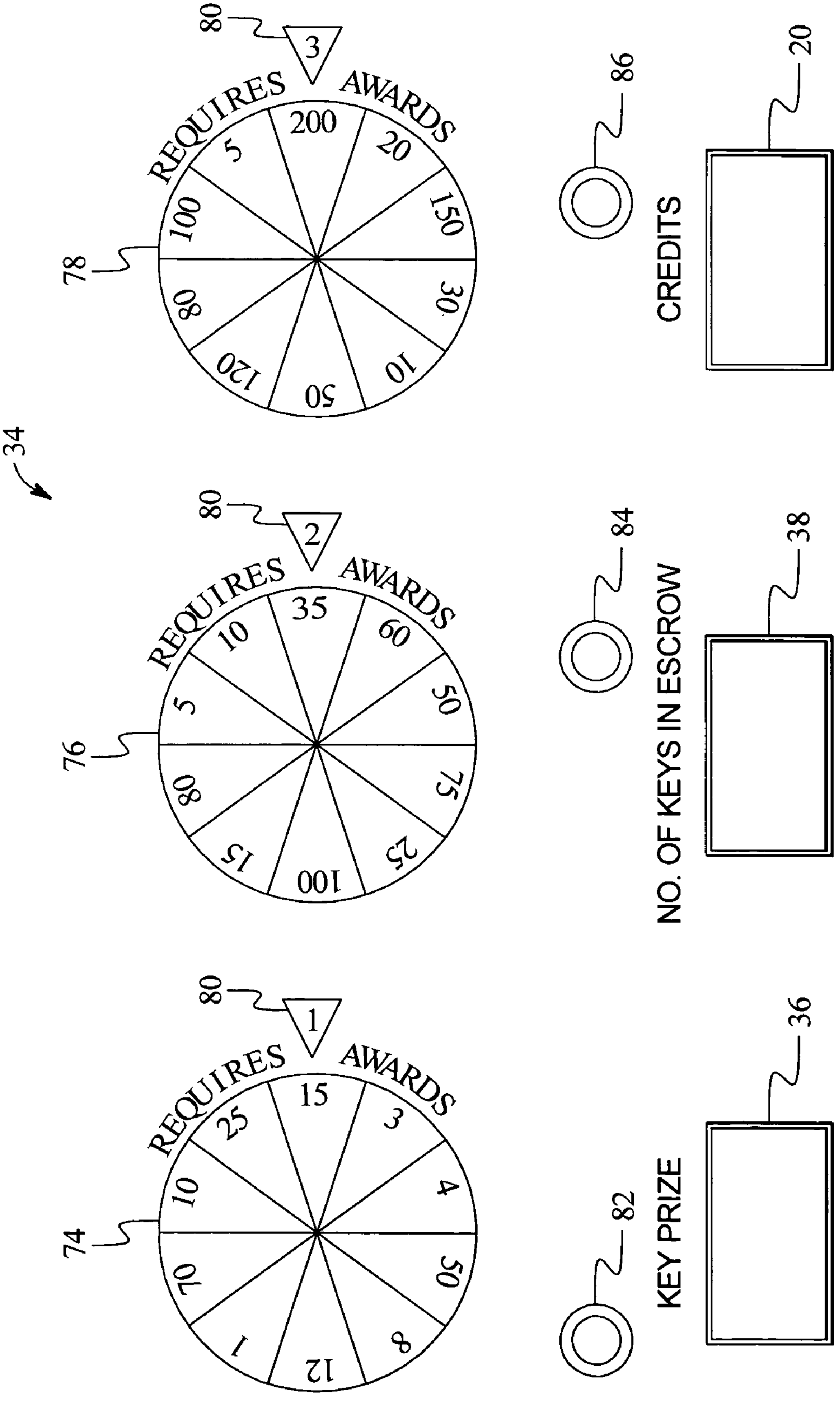
FIG. 7 is a diagram of an alternative embodiment of the present invention, wherein a wheel contains different prize areas and a pointer to select one of said areas.

Referring now to FIG. 7, an alternative embodiment of the present invention is shown, wherein the game provides the display area 34 having a prize display 36, escrow display 38, credit display 20 and a plurality of spinning wheels 74, 76 and 78 each having associated prize maps of varying average value. The prize map of wheel 74 has the lowest average prize value and preferably requires one bonus award to play. The prize map of wheel 76 has the second highest average prize value and preferably requires two bonus awards to play. The prize map of wheel 78 has the highest average prize value and preferably requires three bonus awards to play. The present invention enables the player to spin one of the wheels 74, 76 or 78, thereafter the wheel stops and a pointer 80 designates one of the prizes from the selected prize map. Alternatively, one end of a pointer 80 can be placed at the center of the wheels, wherein the pointer spins about the wheel center while the wheel remains fixed. The pointer 80 randomly stops and designates one of the prizes from the selected prize map. The embodiment preferably contains a suitable separate simulated or electromechanical spin selector 82, 84 or 86 for each wheel 74, 76 and 78, respectively.

It should be appreciated that in the present embodiment, the player still selects which wheel and the number of awards to play. The game then randomly generates the prize, as described above, by selecting a prize from the appropriate map. It should also be appreciated that the player can still choose to play the bonus round, i.e., to consume bonus awards, whenever the player wishes. If the player does not have enough awards to play a particular prize area but attempts to play such area, the game preferably provides a suitable message informing the player to try again. The player can play this embodiment any time by selecting one of the spin selectors 82, 84 or 86.

Figure 8:
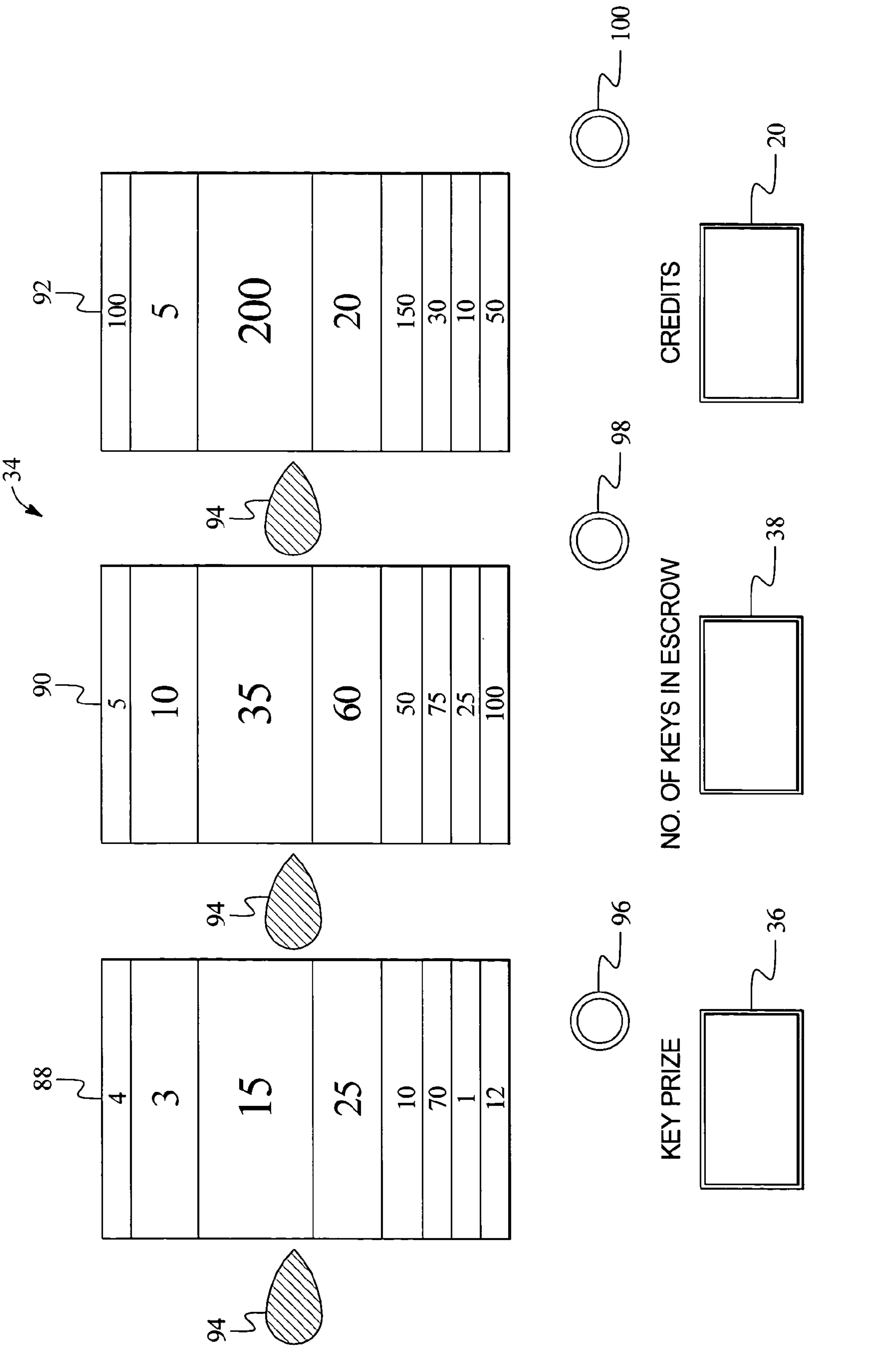
FIG. 8 is a diagram of another alternative embodiment, wherein a reel contains different prize areas and the game displays a selected area to the player.

Referring now to FIG. 8, another random selection embodiment is shown, wherein the game provides the display area 34 having a prize display 36, escrow display 38, credit display 20 and a plurality of spinning reels 88, 90 and 92 each having associated prize maps of varying average value. The prize map of reel 88 has the lowest average prize value and is the least costly to play. The prize map of reel 90 has the second highest average prize value and costs the second most to play. The prize map of reel 92 has the highest average prize value and costs the most to play. The present invention enables the player to select and spin one of the reels 88, 90 and 92, thereafter the reel randomly stops and a pointer 94 designates one of the prizes from the selected prize map. Alternatively, the game can display only one prize of the reels to a player at any time, wherein the displayed prize is the designated prize after the player selected reel spins and stops. Here, the present invention does not preferably include a pointer 94.

The player spins one of the reels, as before, by selecting a simulated or electromechanical spin selector 96, 98 or 100 for each reel 88, 90 or 92, respectively. The player still decides which prize map to play and the number of bonus awards to consume. As before, if the player does not have enough bonus awards to play a particular reel, the game provides a suitable message and enables the player to re-select another spin selector. The player can play this embodiment any time by selecting the spin selectors 96, 98 or 100.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device having a bonus round selectively accessible by a player, said gaming device comprising:

at least one display device configured to display: (i) at least one symbol display having at least one award symbol associated with a number of awards, and (ii) at least one prize indicator; at least one prize selector associated with the at least one prize indicator; and a controller configured to operate with the at least one display device and the at least one prize selector to:

(a) for at least one play of a base game, randomly generate a plurality of symbols including said at least one award symbol, (b) escrow any awards associated with the randomly generated award symbols, (c) if a predetermined number of awards are escrowed, enable the player to selectively access said at least one prize indicator by selecting said at least one prize selector associated with said at least one prize indicator (d) if the player accesses said at least one prize indicator, randomly select one of a plurality of prizes associated with said at least one prize indicator, and (e) provide the randomly selected prize to the player.

2. The gaming device of claim 1, wherein the at least one display device is configured to display a plurality of symbol displays, wherein each symbol display has at least one award symbol, said award symbols each associated with a number of awards.

3. The gaming device of claim 1, wherein the at least one display device is configured to display an escrow display configured to operate to display any escrowed awards.

4. The gaming device of claim 1, wherein the at least one display device is configured to display a plurality of prize indicators and a set of prizes associated with each of said prize indicators.

5. The gaming device of claim 4, wherein each set of prizes has a different average value.

6. The gaming device of claim 5, wherein the controller is configured to operate with the at least one display device to display, for each of said prize indicators, at least one prize of said set of prizes associated with said prize indicator.

7. The gaming device of claim 5, wherein each of said prize indicators has an associated predetermined number of awards that are required to be escrowed to enable the player to selectively access said prize indicator.

8. The gaming device of claim 7, wherein for each prize indicator, said predetermined number of awards associated with said prize indicator is linearly proportional to said average value of the set of prizes associated with said prize indicator.

9. The gaming device of 7, wherein for each prize indicator, said predetermined number of awards associated with said award prize indicator is non-linearly proportional to said average value of the set of prizes associated with said prize indicator.

10. The gaming device of claim 1, wherein the prize indicator includes a selectively illuminated mechanical display, and the prize selector includes a mechanical device.

11. The gaming device of claim 1, wherein the prize indicator includes a simulated display, and the prize selector includes an area of a touch screen display controlled by said controller.

12. The gaming device of claim 1, wherein the prize indicator includes a simulated display and the prize selector includes a mechanical device.

13. The gaming device of claim 1, wherein the prize indicator includes a wheel displaying a set of prizes associated with said prize indicator, and the controller is configured to operate to cause a designation of one prize of said set.

14. The gaming device of claim 13, wherein the controller is configured to operate to designate said prize with a pointer.

15. The gaming device of claim 1, wherein the prize indicator includes a reel displaying a set of prizes, and the controller is configured to operate to cause a designation of one prize of said set.

16. The gaming device of claim 15, wherein the controller is configured to operate to designate said prize with a pointer.

17. The gaming device of claim 1, wherein said symbol display includes a plurality of reels.

18. A gaming device comprising:

at least one display device;

at least one input device including a prize indicator;

at least one processor; and at least one memory device which stores a plurality of instructions, which when executed by the at least one processor, cause the at least one processor to operate with the at least one display device and the at least one input device to:

(a) cause a symbol display to randomly generate a plurality of symbols in association with at least one play of a base game, said plurality of symbols including an award symbol, wherein at least one award is associated with each generated award symbol;

(b) escrow the awards associated with said award symbols generated in association with the at least one play of the base game;

(c) enable a player to selectively access a prize selector associated with said prize indicator if a predetermined number of awards associated with the prize selector are escrowed;

(d) if the player accesses said prize selector, randomly select one of a plurality of different prizes of the prize indicator; and (e) provide the selected prize to the player.

19. The gaming device of claim 18, wherein a plurality of awards are associated with the award symbol.

20. The gaming device of claim 18, wherein said plurality of symbols includes a plurality of award symbols, wherein a different number of awards are associated with each said award symbol.

21. The gaming device of claim 18, wherein said prize indicator includes a wheel displaying said prizes.

22. The gaming device of claim 18, wherein said prize indicator includes a reel displaying said prizes.

23. The gaming device of claim 18, wherein said symbol display includes a plurality of reels.

24. A gaming device comprising:

at least one display device;

at least one input device including a plurality of separate prize selectors;

at least one processor; and at least one memory device which stores a plurality of instructions, which when executed by the at least one processor, cause the at least one processor to operate with the at least one display device and the at least one input device to:

(a) cause a symbol display to randomly generate a plurality of symbols in association with at least one play of a base game, said plurality of symbols including at least one award symbol, wherein at least one award is associated with each generated award symbol;

(b) escrow the awards associated with said award symbols generated in association with the at least one play of the base game;

(c) enable a player to selectively access one of the plurality of separate prize selectors if at least a predetermined number of awards required to access said prize selector are escrowed, wherein each prize selector is associated with a separate prize indicator;

(d) if the player accesses one of said prize selectors, randomly select one of a plurality of different prizes of the prize indicator associated with said accessed prize selector; and (e) provide the selected prize to the player.

25. The gaming device of claim 24, wherein said plurality of symbols include a plurality of award symbols, wherein at least one award is associated with each award symbol and a plurality of awards are associated with at least one of said award symbols.

26. The gaming device of claim 24, wherein said plurality of symbols include a plurality of award symbols, wherein a different number of awards are associated with each said award symbol.

27. The gaming device of claim 24, wherein at least one of the prizes of one of said prize indicators is different from the prizes of another one of said prize indicators.

28. The gaming device of claim 24, wherein the prizes of one of said prize indicators have a different average value than the prizes of another one of said prize indicators.

29. The gaming device of claim 24, wherein each of said prize selectors has a different predetermined number of awards required to access said prize selector.

30. A gaming device comprising:

at least one display device;

at least one input device;

at least one processor; and at least one memory device which stores a plurality of instructions, which when executed by the at least one processor, cause the at least one processor to operate with the at least one display device and the at least one input device to:

(a) cause a symbol display to randomly generate a plurality of symbols in association with at least one play of a base game, said plurality of symbols including at least one award symbol, wherein at least one award is associated with each generated award symbol;

(b) escrow the awards associated with said award symbols generated in association with the at least one play of the base game;

(c) enable a player to selectively access one of a plurality of prize indicators if at least a predetermined number of awards required to access said prize indicator are escrowed;

(d) if the player accesses one of said prize indicators, randomly select one of a plurality of prizes of said accessed prize indicator; and (e) provide the selected prize to the player.

31. The gaming device of claim 30, wherein said plurality of symbols include a plurality of award symbols, wherein at least one award is associated with each award symbol and a plurality of awards are associated with at least one of said award symbols.

32. The gaming device of claim 30, wherein said plurality of symbols include a plurality of award symbols, wherein a different number of awards are associated with each said award symbol.

33. The gaming device of claim 30, wherein at least one of the prizes of one of said prize indicators is different from the prizes of another one of said prize indicators.

34. The gaming device of claim 30, wherein the prizes of one of said prize indicators have a different average value than the prizes of another one of said prize indicators.

35. The gaming device of claim 30, wherein each of said prize indicators has a different predetermined number of awards required to access said prize indicator.

36. A method for operating a gaming device including a plurality of instructions, said method comprising:

(a) enabling play of a base game which includes causing at least one display device to randomly display a plurality of symbols, said plurality of symbols including at least one award symbol;

(b) providing at least one award to a player for obtaining said at least one award symbol in the play of the base game;

(c) causing at least one processor to execute the plurality of instructions to escrow any of the awards provided to the player;

(d) causing the at least one display device to display said escrowed awards to the player in an escrow display;

(e) enabling the player to selectively play a bonus round if the player has a designated number of escrowed awards; and (f) if the player has the designated number of escrowed awards and the player plays the bonus round:

(i) randomly determining a prize from a set of a plurality of prizes, and (ii) providing the randomly determined prize to the player.

37. The method of claim 36, which includes providing a plurality of awards to the player for obtaining said at least one award symbol.

38. The method of claim 36, which includes providing at least one award to the player if an award generating combination of symbols are displayed.

39. The method of claim 36, which includes causing the at least one processor to execute the plurality of instructions to subtract a number of awards from said escrow display when the player plays the bonus round.

40. The method of claim 39, wherein enabling the player to selectively play the bonus round includes providing a plurality of prize indicators and selecting one of said prize indicators.

41. The method of claim 40, which includes enabling the player to select one of said prize indicators if the escrowed awards reach a requisite amount of awards for said prize indicator.

42. The method of claim 41, which includes causing the at least one processor to execute the plurality of instructions to maintain a set of prizes for each prize indicator, each set having prizes of a different average value.

43. The method of claim 42, wherein causing the at least one processor to execute the plurality of instructions to select one of the prize indicators includes subtracting more awards from said escrow display for one of the prize indicators having a higher average value set of prizes than for another one of the prize indicators having a lower average value set of prizes.

44. The method of claim 36, wherein said steps are provided to the player through a data network.

45. The method of claim 44, wherein the data network is an internet.

46. A method for operating a gaming device including a plurality of instructions, said method comprising:

(a) for at least one play of a base game, causing at least one display device to randomly display at least one award symbol associated with a number of awards;

(b) causing at least one processor to execute the plurality of instructions to accumulate the awards associated with said displayed award symbols in an escrow;

(c) enabling a player to selectively access at least one prize indicator if the escrow includes a predetermined number of awards, wherein the player accesses said prize indicator by selecting a prize selector associated with said prize indicator;

(d) if the player accesses said prize indicator, causing the at least one processor to execute the plurality of instructions to randomly select one of a plurality of prizes associated with said prize indicator; and (e) providing said selected prize to the player.

47. The method of claim 46, wherein said steps are provided to the player through a data network.

48. The method of claim 47, wherein the data network is an internet.

49. A method for operating a gaming device including a plurality of instructions, said method comprising:

(a) causing at least one processor to execute the plurality of instructions to randomly generate a plurality of symbols in a base game wherein said plurality of generated symbols includes an award symbol and at least one award is associated with each generated award symbol;

(b) causing the at least one processor to execute the plurality of instructions to accumulate the awards associated with said generated award symbols in an escrow;

(c) enabling a player to selectively access a prize selector if the escrow includes a predetermined number of awards associated with the prize selector, wherein said prize selector is associated with a prize indicator which includes a plurality of different prizes;

(d) if the player accesses said prize selector, causing the at least one processor to execute the plurality of instructions to randomly select one of the prizes of the prize indicator associated with the accessed prize selector;

(e) causing at least one display device to display the selected prize; and (f) providing said selected prize to the player.

50. The method of claim 49, wherein said steps are provided to the player through a data network.

51. The method of claim 50, wherein the data network is an Internet.

52. A method for operating a gaming device including a plurality of instructions, said method comprising:

(a) causing at least one processor to execute the plurality of instructions to randomly generate a plurality of symbols in a base game wherein said plurality of generated symbols includes an award symbol and at least one award is associated with each generated award symbol;

(b) causing the at least one processor to execute the plurality of instructions to accumulate the awards associated with said generated award symbols in an escrow;

(c) enabling a player to selectively access one of a plurality of separate prize selectors if the escrow includes at least a predetermined number of awards required to access said prize selector, wherein each prize selector is associated with one of a plurality of prize indicators which includes a plurality of different prizes;

(d) if the player accesses one of said prize selectors, causing the at least one processor to execute the plurality of instructions to randomly select one of the prizes of the prize indicator associated with the accessed prize selector;

(e) causing at least one display device to display the selected prize; and (f) providing said selected prize to the player.

53. The method of claim 52, wherein said steps are provided to the player through a data network.

54. The method of claim 53, wherein the data network is an internet.

55. A method for operating a gaming device including a plurality of instructions, said method comprising:

(a) causing at least one processor to execute the plurality of instructions to randomly generate a plurality of symbols in a base game wherein said plurality of generated symbols includes an award symbol and at least one award is associated with each generated award symbol;

(b) causing the at least one processor to execute the plurality of instructions to accumulate the awards associated with said generated award symbols in an escrow;

(c) enabling a player to selectively access one of a plurality of prize indicators if the escrow includes at least a predetermined number of awards required to access said prize indicator, wherein each prize indicator includes a plurality of different prizes;

(d) if the player accesses one of said prize indicators, causing the at least one processor to execute the plurality of instructions to randomly select one of the prizes of the accessed prize indicator;

(e) causing at least one display device to display the selected prize; and (f) providing said selected prize to the player.

56. The method of claim 55, wherein said steps are provided to the player through a data network.

57. The method of claim 56, wherein the data network is an internet.

* * * * *